United States Patent [19]
Forster

[11] 4,076,091
[45] Feb. 28, 1978

[54] SELF-PROPELLED VEHICLE

[75] Inventor: Larry G. Forster, Shoshoni, Wyo.

[73] Assignee: Chair-E-Yacht, Inc., Shoshoni, Wyo.

[21] Appl. No.: 671,779

[22] Filed: Mar. 30, 1976

[51] Int. Cl.$^2$ .............................................. B62D 61/08
[52] U.S. Cl. ...................................... 180/26; 280/775
[58] Field of Search ................. 180/13, 26 R, DIG. 3, 180/31; 280/87 HA, 279

[56] References Cited

U.S. PATENT DOCUMENTS

| | | | |
|---|---|---|---|
| 1,557,456 | 10/1925 | Hazeltine | 280/87 HA |
| 1,619,980 | 3/1927 | Kelsey | 280/87 HA |
| 2,160,035 | 5/1939 | Schwinn | 280/279 |
| 3,099,326 | 7/1963 | Weigel | 180/26 R |
| 3,777,836 | 12/1973 | Riza | 180/26 R |
| 3,799,569 | 3/1974 | Baker | 280/87 HA |
| 3,888,324 | 6/1975 | Kossow | 180/26 R X |
| 3,905,436 | 9/1975 | Harchak | 180/DIG. 3 X |
| 3,921,740 | 11/1975 | Forster | 180/119 X |

FOREIGN PATENT DOCUMENTS

| | | | |
|---|---|---|---|
| 1,147,084 | 11/1957 | France | 180/26 R |
| 1,076,591 | 10/1954 | France | 180/26 R |

*Primary Examiner*—Joseph F. Peters, Jr.
*Assistant Examiner*—Terrance L. Siemens
*Attorney, Agent, or Firm*—Bernard L. Kleinke

[57] ABSTRACT

A self-propelled vehicle includes front and rear wheel assemblies mounted on a frame for supporting it rollably above the ground, the front wheel assembly being swingably mounted to the front portion of the frame. A motor or engine is mounted on the front wheel assembly for driving it, and a steering column is rotatably mounted on the frame in a backwardly inclined position. A bracket enables the angular position of the steering column to be adjusted, and a linkage connects the steering column and front wheel assembly for moving the front wheel assembly angularly in response to rotational movements of the steering column for steering purposes. The axis of rotation of the front wheel assembly is disposed in a backwardly inclined position to add greater stability to the vehicle. The steering column includes a pair of telescoping members and a device for fixing them adjustably in a given axial position relative to one another for enabling the length of the steering column to be adjusted to a desired length.

9 Claims, 6 Drawing Figures

SELF-PROPELLED VEHICLE

The present invention relates to a self-propelled vehicle, and it more particularly relates to a small vehicle having an adjustable steering column.

Many different types of small self-propelled vehicles have been known in the art. Some of them have had front and rear wheel assemblies with the front wheel assembly being swingably mounted to the frame of the vehicle. The motor or engine is mounted on the front wheel assembly to drive it and to provide for greater stability of the vehicle, especially when the vehicle is moving into a turn, whereby the chance of the vehicle tipping over is greatly reduced. For examples of such vehicles, reference may be made to the following U.S. Pat. Nos. 3,099,326; 3,434,558; 3,506,080; 3,605,929 and 3,777,836. As shown in the foregoing-mentioned patents, the vehicles each have their front wheel assembly arranged such that the axis of rotation of the front wheel assembly is disposed in a backwardly inclined position. As a result, during a turn, the weight of the engine or motor mounted on the front wheel assembly leans into the turn to provide for greater stability for the vehicle.

While such vehicles may be satisfactory for some applications, it would be highly desirable to have such a stable front wheel drive vehicle which includes an adjustable steering column to accommodate various different drivers of the vehicle. Such a highly stable vehicle with adjustable steering would be highly useful for handicapped persons. For example, the self-propelled vehicle shown and described in U.S. Pat. No. 3,921,740 is a vehicle which is adapted to carry a handicapped person seated in a wheel chair, whereby the handicapped person can drive the vehicle in a convenient manner. Therefore, it would be highly desirable to have a vehicle which is extremely stable and which has an adjustable steering column for enabling the driver to be able to conveniently steer the vehicle, even while the driver is seated in a wheel chair carried by the vehicle.

Therefore, the principal object of the present invention is to provide a new and improved self-propelled vehicle, which is extremely stable in operation and which includes an adjustable steering column.

Briefly, the above and further objects of the present invention are realized by providing a self-propelled vehicle which includes front and rear wheel assemblies and which includes a drive means mounted on the front wheel assembly. A steering column is rotatably mounted on the vehicle frame in a backwardly inclined position, and a bracket device enables the steering column to be adjusted angularly positionally. A linkage connecting the steering column and the front wheel assembly moves the front wheel assembly angularly in response to rotational movements of the steering column for steering purposes. The axis of rotation for the front wheel assembly is disposed in a backwardly inclined position, which may or may not be parallel to the steering column, depending upon the desired angular position of the steering column. The steering column further includes a pair of telescoping members and a device for fixing them adjustably in a given axial position relative to one another.

For other features and advantages of the present invention and for a more complete understanding of the objects and features of the present invention, reference may be made to the following detailed description, taken in connection with the accompanying drawings, wherein:

FIG. 4 is a front elevational view of the vehicle of FIG. 3 taken substantially along the line 4—4 thereof;

FIG. 5 is a cross-sectional plan view of the vehicle of FIG. 2 taken along the lines 5—5 thereof with a portion thereof shown in broken lines for illustration purposes; and FIG. 6 is a detail view of a portion of the steering column of FIG. 2.

Figure 1:
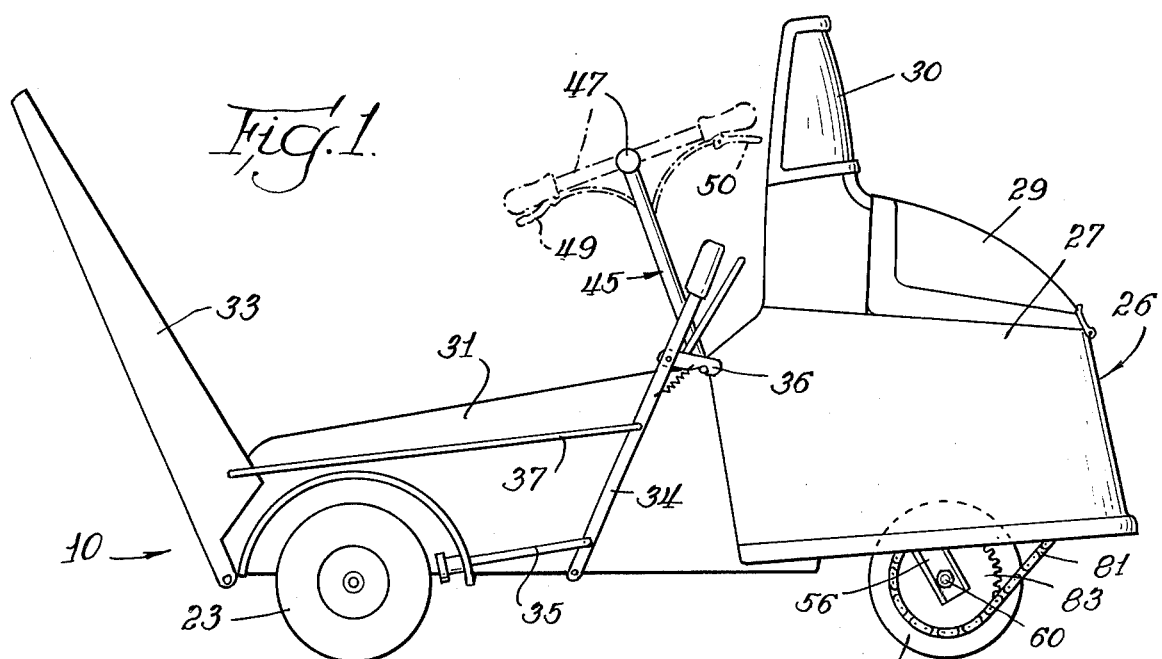
FIG. 1 is a side elevational view of a self-propelled vehicle, which is constructed in accordance with the present invention.
Figure 2:
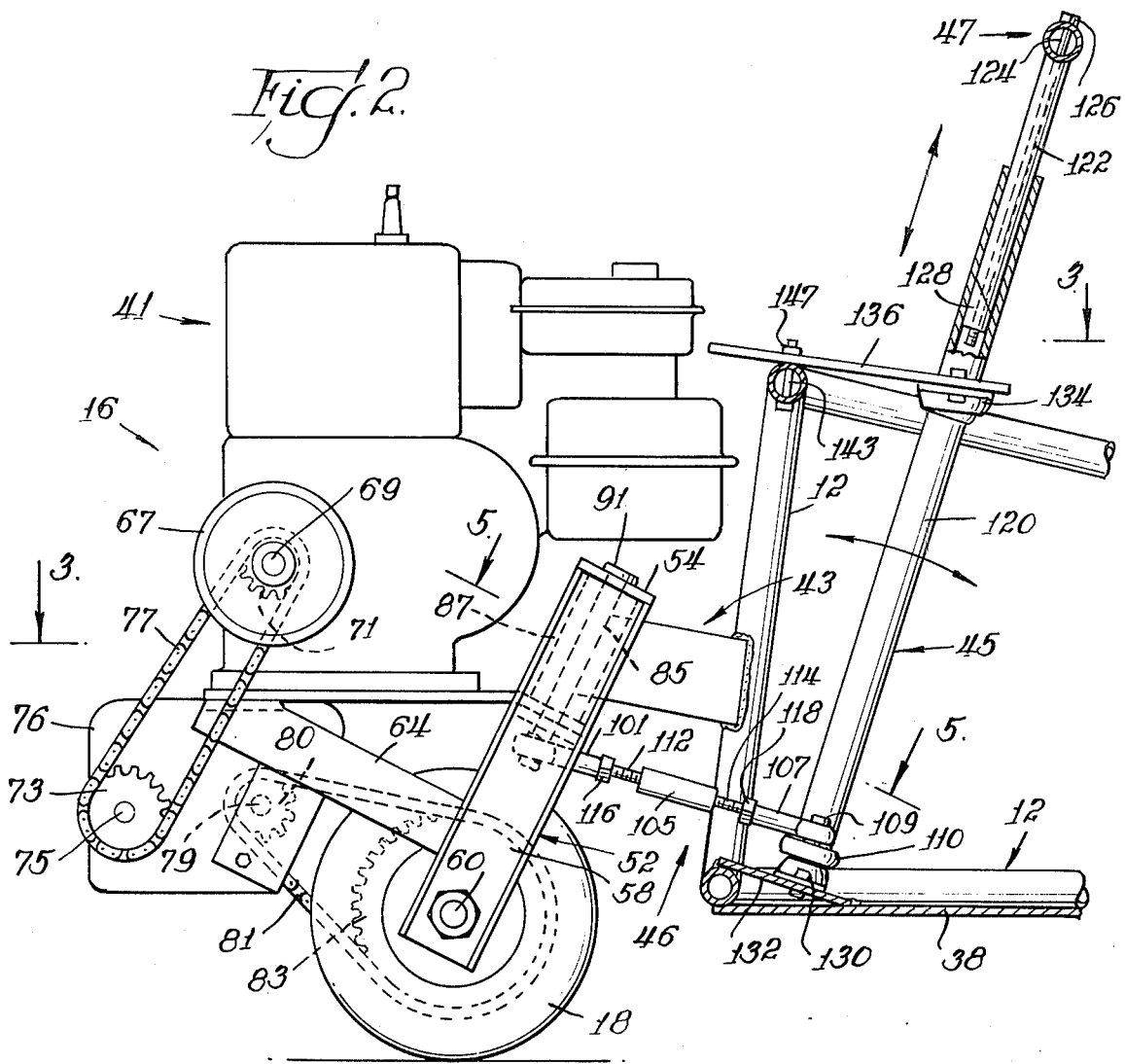
FIG. 2 is an enlarged side elevational view of the front portion of the vehicle of FIG. 1, illustrating it with the cowl removed therefrom for illustration purposes.

Referring now to the drawings, and more particularly to FIGS. 1, 2, 3 and 4 thereof, there is shown a self-propelled vehicle 10, which is constructed in accordance with the present invention, and which is adapted to carry an operator who may be seated in a wheel chair (not shown) in a similar manner to the vehicle shown in U.S. Pat. No. 3,921,740. While the vehicle 10 is adapted to be used by a handicapped person seated in a wheel chair, it is to be understood that other persons may also use the vehicle of the present invention, and in this regard, the vehicle 10 may be employed on golf courses for transporting golf players or the vehicle 10 may be used to transport a number of people about the grounds of an amusement park or zoo. The vehicle 10 generally comprises a vehicle frame generally indicated at 12, a front wheel assembly 16 having a single front wheel 18, a rear wheel assembly 21 having a pair of rear wheels, such as the rear wheel 23 (FIG. 1), a chariot-shaped open vehicle body 26 (FIG. 1) mounted on the frame 12 with a contoured front cowl 27 having a hingedly connected front lid or hood 29 for permitting access to the front wheel assembly 16 and having an up-standing windshield 30, and an open rear portion 31 terminating rearwardly in a loading ramp 33 which may be lowered to the ground by means of a control lever 34. A parking brake 35 attached to the lower portion of the lever 34 moves into engagement with the rear wheel 23 to serve as a parking brake. As shown in FIG. 1 of the drawings, a latch 36 holds the pivotally-mounted lever 34 in its forward position to cause a rod 37 connecting the lever 34 with a ramp 33 to hold it in its closed upright position. As best seen in FIG. 2 of the drawings, a driving means or engine 41 is mounted above the single front wheel 18 for driving it to propel the vehicle 10 along the ground. A front wheel assembly pivot or swivel connection 43 connects the front wheel assembly 16 to the frame 12 as hereinafter described in greater detail. A backwardly inclined adjustable steering control column 45 mounted on the frame 12 is connected to the front wheel assembly 16 by means of a linkage generally indicated at 46 to cause the front wheel assembly 16 to pivot or swing to the right or left for turning purposes in response to rotational movements of the steering column 45 as hereinafter described in greater detail. A handle bar 47 at the upper end portion of the steering column 45 is used to control the speed and braking of the engine 41 in a manner similar to the hand controls shown and described in the foregoing-mentioned U.S. Pat. No. 3,921,740.

According to the present invention, the front wheel assembly 16 is controlled by the steering column 45 which is both tiltable and telescoping to accommodate various different vehicle operators as hereinafter described in greater detail. Also, as hereinafter described in greater detail, the three-wheel vehicle 10 while having a tiltable and telescoping steering column, is very stable even during turns due to the construction of the front wheel assembly 16. All of these features are especially important when the vehicle operator is a handicapped person seated in a wheel chair.

Considering now the front wheel assembly 16 in greater detail with reference to FIGS. 2, 3, 4 and 5 of the drawings, the front wheel assembly includes a fork 52 comprising a channel-shaped upper cross member 54 having a pair of downwardly depending channel-shaped legs 56 and 58 fixed to the opposite ends thereof, and an axle 60 journaled for rotation at its opposite ends to the distal end portions of the legs 56 and 58 for supporting rotatably the single front wheel 18. A platform 62 supported between the legs 56 and 58 by a transverse bar 63 fixed at its opposite ends to the legs 56 and 58 under and spaced from the upper cross member 54. A platform brace 64 is connected to the underside of the front portion of the platform 74 and is fixed to the fork 52.

A centrifugal clutch 67 engages when the engine 41 is running, and when one of the hand controls 49 and 50 is actuated the clutch disengages and the output shaft 69 of the engine 41 then is braked automatically. As best seen in FIG. 2 of the drawings, a sprocket 71 is fixed to the output shaft 69, and a driven sprocket 73 is fixed to an input shaft 75 of a gear transmission 76, a chain 77 interconnecting drivingly the sprockets 71 and 73. An output shaft 79 of the transmission 76 has a sprocket 80 fixed to it for driving via a chain 81 a larger sprocket 83, which in turn drives the wheel 18.

Considering now the pivot or swivel connection 43 in greater detail with reference to FIGS. 2, 3, 4 and 5 of the drawings, the connection 43 includes a post 85 extending between the upper cross member 54 and the bar 63 of the fork 52, and a sleeve 87 surrounding concentrically the post 85 and extending between the upper cross member 54 and the bar 63. As shown in FIG. 4 of the drawings, a cotter pin 89 fixes the bottom distal end portion of the post 85 extending through an opening in the bar 63 to fix an enlarged head 91 of the post 85 (FIG. 3) to the upper cross member 54 through which the post 85 extends. A pair of parallel spaced-apart arms 93 and 95 are fixed at their forward ends to the tubular sleeve 87 and at their rear ends to an upstanding portion of the frame 12. The arms 93 and 95 are fixed rigidly to both the sleeve 87 and the frame 12 by any suitable technique, such as by welding.

As shown in FIG. 2 of the drawings, a pair of upper and lower bearings 97 and 99 are disposed within the sleeve 87 to mount it rotatably relative to the post 85 fixed to the fork 52. It is to be understood that at least one of the bearings 97 and 99 is a thrust bearing. Thus, when the linkage 46 applies forces to the fork 52, the fork and the post 85 fixed to it can pivot or swing to the right or left, and the post 85 rotates within the sleeve 87 which is fixed to the frame 12 by means of the arms 93 and 95.

According to the present invention, the fork 52 is inclined backwardly so that when the front wheel assembly 16 pivots or swings to the right or left about the connection 43, the engine 41, which is mounted above the front wheel 18, helps to maintain the stability of the vehicle 10. In this regard, the weight of the engine 41 is used to lean into the turn as a result of the backwardly inclined disposition of the fork 52. The engine 41 moves in the direction of the turn to help prevent the vehicle from tipping over during a turn.

In order to obtain best results for helping to prevent the self-propelled vehicle 10 from tipping over, it has been found that the angle between the plane of the fork 52 and the horizontal should be between 50° and 70°. For even better results, the angle should be somewhere between 60° and 65°. For best results, it has been found that the angle should be 63°.

Figure 3:
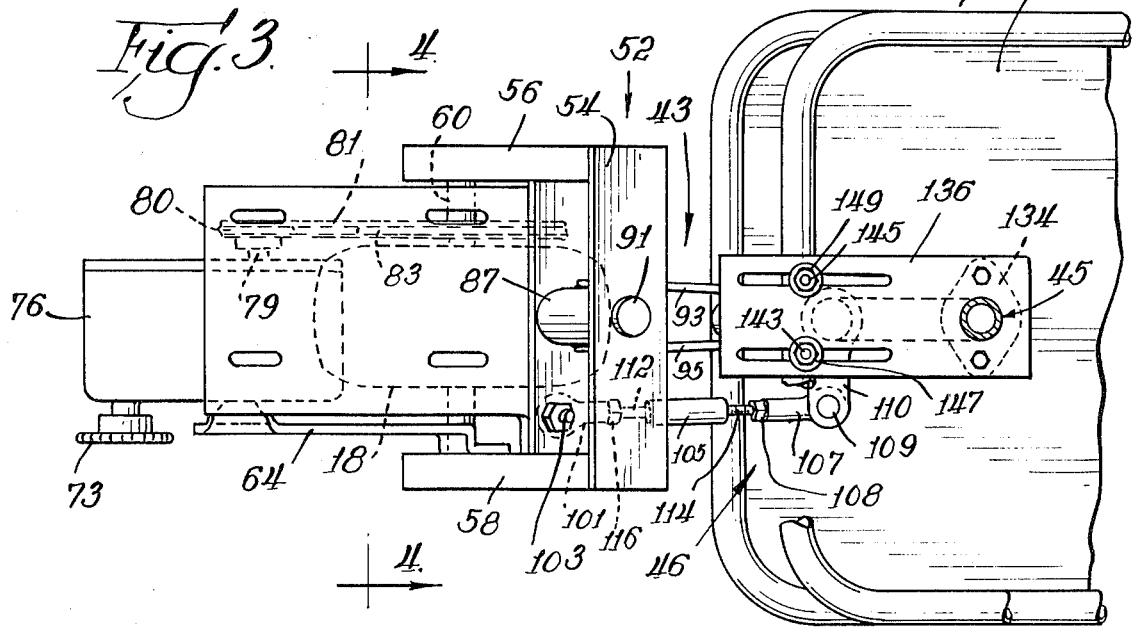
FIG. 3 is a top plan view of the vehicle of FIG. 2 taken substantially along the line 3—3 thereof.

Considering now the linkage 46 in greater detail with reference to FIGS. 2, 3 and 5 of the drawings, the linkage 46 includes a front tie rod end 101 connected at 103 to the underside of the bar 63 between the post 85 and the leg 58 as best seen in FIG. 4 of the drawings. A turnbuckle 105 connects the tie rod end 101 to a rear tie rod end 107 which is connected at 109 to a crank 110, the crank 110 being fixed to the bottom portion of the steering column 45. Axially aligned threaded rods 112 and 114 are each threaded into opposite ends of the turnbuckle 105, and lock nuts 116 and 118 are tightened against the respective tie rod ends 101 and 107. Thus, the turnbuckle 105 enables the overall axial length of the linkage 46 to be adjusted.

Considering now the steering column 45 in greater detail with reference to FIGS. 2, 3 and 6 of the drawings, the steering control column 45 includes an outer tubular member 120 which receives telescopically an inner tubular member 122 which serves as a downwardly depending centrally-disposed stem for the handle bar 47. Thus, the axial length of the steering column 45 may be adjusted to accommodate various different vehicle operators. In order to secure the inner tubular member 122 in an adjusted position, a threaded rod 124 extends through a hole in the handle bar 47 and into the interior of the inner tubular member 122 coaxially disposed therewithin, and a head 126 on the outside of the handle bar 47 is tightened in place by means of a wedge nut 128 threaded onto the bottom end portion of the threaded rod 124. It should be noted also that if desired, the handle bar 47 may be tightened in an angular position other than the position as shown in solid lines in FIG. 1 of the drawings.

A lower self-aligning bearing 130 bolted to an inclined ramp plate 132 extending between the frame 12 and the floor 38 journals the bottom end portion of the outer tubular member 120. An uppr self-aligning bearing 134 journals for rotation an intermediate upper portion of the outer tubular member 120. In order to enable the steering column 45 to tilt forwardly or backwardly, an elongated adjustment plate 136 has an opening for receiving the outer tubular member 120 and has the upper self-aligning bearing 134 bolted to the underside of the rear portion thereof. A pair of longitudinally extending elongated slots 138 and 141 in the front portion of the adjustment plate 136 receive respective bolts 145 and 143, which extend through a pair of aligned holes in a horizontally-disposed upper portion of the frame 12. A pair of nuts 147 and 149 are tightened onto the respective bolts 143 and 145 to fix adjustably the position of the plate 136 and thus the steering column 45 in a desired position. Thus, for the purpose of tilting the steering column 45 backwardly, the nuts 147 and 149 may be loosened to slide the plate 136 backwardly until the steering column 45 is in a desired angular disposition so that the nuts 147 and 149 may thereafter be tightened to retain the steering column in position. It should be noted that if the elongated adjustment slots 138 and 141 are made wide enough relative to the bolts 145 and 143, the adjustment plate 136 may be canted slightly to the right or to the left as desired by the vehicle operator, whereby the steering column 45 would then assume a corresponding adjusted position.

In view of the foregoing description, it should now be apparent that there is provided in accordance with the present invention a self-propelled vehicle which has a front wheel assembly of a highly stable design and which has a tiltable and telescoping steering column associated therewith. The front wheel drive vehicle of the present invention is highly stable, especially during turns, and it also has a readily and conveniently adjustable steering column.

While the present invention has been described in connection with a particular embodiment thereof, it will be understood that many changes and modifications of the invention may be made by those skilled in the art without departing from the true spirit and scope thereof. For example, it will become apparent to those skilled in the art that the front wheel assembly may have a plurality of wheels instead of a single wheel as shown and described herein. Accordingly, the appended claims are intended to cover all such changes and modifications as fall within the true spirit and scope of the present invention.

What is claimed is:

1. A vehicle, comprising:
   a frame;
   front and rear wheel assemblies mounted on said frame for supporting rollably said frame above the ground, said front wheel assembly being swingably mounted to the front portion of said frame;
   drive means mounted on said front wheel assembly for driving said front wheel assembly to enable the vehicle to be propelled along the ground;
   mounting means for attaching rotatably said front wheel assembly to said frame;
   a steering column rotatably mounted on said frame;
   bearing means for mounting said steering column in a backwardly inclined position;
   bracket means connecting said bearing means to said frame for adjusting angularly positionally said steering column;
   a linkage connecting said steering column and front wheel assembly for moving said front wheel assembly angularly in response to rotational movements of said steering column for steering purposes; and
   wherein said bearing means including a pair of self-aligning bearings, one of said bearings surrounding the lower end portion of said steering column and fixed to said frame, the other one of said bearings being attached to said bracket means.

2. A vehicle according to claim 1, wherein said mounting means is connected to said frame and enables the axis of rotation for said front wheel assembly to be disposed in a backwardly inclined position.

3. A vehicle according to claim 1, wherein said steering column includes a pair of telescoping members and a device for fixing them adjustably in a given axial position relative to one another.

4. A vehicle according to claim 3, wherein said device is a wedge nut.

5. A vehicle according to claim 1, wherein said bracket means includes a plate having at least one elongated slot therein for receiving a screw therethrough tightened into a tapped receptacle on said frame.

6. A vehicle according to claim 1, wherein said linkage includes a crank fixed to said steering column, a tie rod connecting said crank and said front wheel assembly.

7. A vehicle according to claim 1, wherein said steering column terminates at its upper end in a pair of handle bars.

8. A vehicle, comprising:
   a frame;
   front and rear wheel assemblies mounted on said frame for supporting rollably said frame above the ground, said front wheel assembly being swingably mounted to the front portion of said frame;
   drive means mounted on said front wheel assembly for driving said front wheel assembly to enable the vehicle to be propelled along the ground;
   mounting means for attaching rotatably said front wheel assembly to said frame;
   a steering column rotatably mounted on said frame;
   bearing means for mounting said steering column in position;
   bracket means connecting said bearing means to said frame for said steering column;
   a linkage connecting said steering column and front wheel assembly for moving said front wheel assembly angularly in response to rotational movements of said steering column for steering purposes; and
   said linkage including a crank fixed to said steering column, a tie rod connecting said crank and said front wheel assembly, said tie rod including a turnbuckle and a pair of tie rod ends connected in axial alignment with one another by said turnbuckle.

9. A vehicle, comprising:
   a frame;
   front and rear wheel assemblies mounted on said frame for supporting rollably said frame above the ground, said front wheel assembly being swingably mounted to the front portion of said frame;
   drive means mounted on said front wheel assembly for driving said front wheel assembly to enable the vehicle to be propelled along the ground;
   mounting means for attaching rotatably said front wheel assembly to said frame;
   a steering column rotatably mounted on said frame;
   bearing means for mounting said steering column in position;
   bracket means connecting said bearing means to said frame for said steering column;
   a linkage connecting said steering column and front wheel assembly for moving said front wheel assembly angularly in response to rotational movements of said steering column for steering purposes;
   a rear loading ramp swingably connected to said frame and movable between a raised and a lowered position;
   a parking brake for preventing rotation of at least one of said wheel assemblies; and
   a lever for controlling the raising and lowering of said ramp and for actuating said brake.

* * * * *